(12) United States Patent
Dotti et al.

(10) Patent No.: US 10,829,568 B2
(45) Date of Patent: Nov. 10, 2020

(54) TUBULAR REACTOR POLYMERIZATION INITIATOR INJECTOR DEVICE, TUBULAR REACTOR FOR CONTINUOUS POLYMERIZATION OF OLEFINS, AND A PROCESS FOR PRODUCTION OF POLYMERS AND COPOLYMERS OF ETHYLENE

(71) Applicant: Braskem S.A., Camaçari (BR)

(72) Inventors: Eduardo José Dotti, São Paulo (BR);
Paulo Henrique Konat Gandolfi, São Paulo (BR); Vitor Dal Bó Abella, São Paulo (BR)

(73) Assignee: Braskem S.A., Camaçari (BR)

( * ) Notice: Subject to any disclaimer, the term of this patent is extended or adjusted under 35 U.S.C. 154(b) by 109 days.

(21) Appl. No.: 16/065,275

(22) PCT Filed: Dec. 22, 2015

(86) PCT No.: PCT/BR2015/050268
§ 371 (c)(1),
(2) Date: Jun. 22, 2018

(87) PCT Pub. No.: WO2017/106940
PCT Pub. Date: Jun. 29, 2017

(65) Prior Publication Data
US 2019/0322771 A1    Oct. 24, 2019

(51) Int. Cl.
*C08F 2/01* (2006.01)
*C08F 10/02* (2006.01)
(Continued)

(52) U.S. Cl.
CPC .............. *C08F 2/01* (2013.01); *B01F 5/0451* (2013.01); *B01F 5/0652* (2013.01); *B01J 4/002* (2013.01);
(Continued)

(58) Field of Classification Search
CPC .......... C08F 2/01; C08F 10/02; B01F 5/0451; B01F 5/0652; B01F 5/0461; B01J 4/002; B01J 19/26
See application file for complete search history.

(56) References Cited

U.S. PATENT DOCUMENTS

| 3,691,145 A | 9/1972 | Gierth et al. |
| 3,917,577 A | 11/1975 | Trieschmann et al. |

(Continued)

FOREIGN PATENT DOCUMENTS

| CN | 203227474 U | 10/2013 |
| EP | 449092 B1 | 11/1994 |

(Continued)

OTHER PUBLICATIONS

International Search Report issued in PCT/BR2015/050268 dated May 10, 2016 (8 pages).

(Continued)

*Primary Examiner* — Vu A Nguyen
(74) *Attorney, Agent, or Firm* — Osha Bergman Watanabe & Burton LLP (57) ABSTRACT

The present invention refers, in its generality, to a tubular reactor for homo or copolymerization of olefins, with one of more initiator injection devices. The invention also refers to an initiator device in a process fluid stream in a reactor polymerization reactor, and to a process for the production of polymers and copolymers of ethylene, particularly low density polymers (LDPE), that use the said device.

9 Claims, 6 Drawing Sheets

(51) Int. Cl.
*B01F 5/04* (2006.01)
*B01F 5/06* (2006.01)
*B01J 4/00* (2006.01)
*B01J 19/26* (2006.01)
*B01J 19/24* (2006.01)

(52) U.S. Cl.
CPC ........... *B01J 19/2465* (2013.01); *B01J 19/26* (2013.01); *C08F 10/02* (2013.01)

(56) References Cited

U.S. PATENT DOCUMENTS

| | | | |
|---|---|---|---|
| 6,610,797 B1 | 8/2003 | Deckers et al. | |
| 6,677,408 B1 | 1/2004 | Mahling et al. | |
| 6,951,908 B2 | 10/2005 | Groos et al. | |
| 7,737,229 B2 | 6/2010 | Gonioukh et al. | |
| 8,273,835 B2 | 9/2012 | Littmann et al. | |
| 8,308,087 B2 | 11/2012 | Berbee et al. | |
| 2008/0255302 A1 | 10/2008 | Oswald et al. | |
| 2011/0278379 A1* | 11/2011 | Berbee | B01F 5/0451 239/589 |
| 2013/0333832 A1 | 12/2013 | Vittorias et al. | |
| 2015/0175827 A1 | 6/2015 | Keshtkar et al. | |

FOREIGN PATENT DOCUMENTS

| | | |
|---|---|---|
| GB | 93444 A | 8/1963 |
| GB | 1038215 A | 8/1966 |
| GB | 1090823 A | 11/1967 |
| GB | 1569518 A | 6/1980 |
| JP | S6330515 A | 2/1988 |
| WO | 2005/065818 A1 | 7/2005 |

OTHER PUBLICATIONS

Written Opinion issued in PCT/BR2015/050268 dated May 10, 2016 (5 pages).
Extended European Search Report issued in corresponding European Application No. 15910981.8, dated Apr. 25, 2019 (8 pages).
Office Action issued in corresponding European Application No. 15910981.8, dated Mar. 16, 2020 (5 pages).
Vitor Dal Bo Abella; "Estudo de aspectos geometricos de injetor de iniciador na producao de PEBD em CFD", Universidade Federal Do Rio Grande Do Sul; Dec. 9, 2014 (42 pages).

* cited by examiner

TUBULAR REACTOR POLYMERIZATION INITIATOR INJECTOR DEVICE, TUBULAR REACTOR FOR CONTINUOUS POLYMERIZATION OF OLEFINS, AND A PROCESS FOR PRODUCTION OF POLYMERS AND COPOLYMERS OF ETHYLENE

The present invention refers, in its generality, to a tubular reactor for homo or copolymerization of olefins, with one or more initiator injection devices. The application also refers to an initiator of process fluid in a tubular reactor polymerization reactor and to a process of production of polymers and copolymers of ethylene, particularly low-density polymers (LDPE) that use the said device.

PRIOR ART OF THE INVENTION

There are known continuous polymerization processes using tubular reactors to form low-density polymers of ethylene, optionally with one or co-monomers, for example low-density polyethylene (LPDE). The process, in its generality, consists in a polymerization by free radicals, injection initiator at one of more points of a tubular reactor wherein flows a process fluid, totally or partially comprised of ethylene, which is converted into a polymer in a highly exothermic reaction. The reaction occurs typically at pressures between 1000 and 4000 bar, at temperatures between 100 and 400° C., in turbulent flow conditions. One example of description of the prior art, relative to the process of polymerization of LDPE and the respective process flow chart may be found in the ENCYCLOPEDIA OF POLYMER SCIENCE AND ENGINEERING. Vol. 6, pg. 386-426. 1986. Another prior art reference relative to the process of production of LDPE is the article "Fundamentals of the Free-Radical Polymerization of Ethylene", of Ehrliche, P. and Mortimer, G. A., published in Adv. Polymer Sci, vol. 7, pp. 386-448 (1970). In these two references there are found non-exhaustive references of reaction initiators, commoners and chain transfer agents.

The initial temperature of the polymerization reaction—or re-initial temperature, where there exist several points of reaction along the reaction tube—varies between 100 and 280° C. Conversion values in a tubular rector typically vary between 20 and 40 percent.

The polymerization reaction is initiated (and reinitiated) by injecting a solution of initiators and isododecane (solvent) in one or more reaction zones inside the reactor tube. Known examples of initiators are organic or inorganic peroxides, oximes, azo compounds, oxygen, etc. The injected initiator mixes with the process fluid and, in the presence of heat (the process fluid is normally already at an adequate reaction temperature, decomposes, forming free radicals. The decomposition products start the polymerization reaction by free radicals with the ethylene (and optional co-monomers) to form a polymeric product based on ethylene. The reaction is exothermic, forming temperature peaks along the reactor due to each injection of initiator. There is a heat removal system in the reactor sheath, however there is a minimal temperature of the reactor wall, between 100 and 180° C., which is aimed to minimize the formation of incrustations of polymer on the inner wall of the reactor.

The presence of such polymer incrustations on the wall of the reactor reduces the heat exchange of the process fluid with the sheath, and there may occur a temperature increase inside the reactor which may cause loss of control of the reaction. This fact is known, for example, as pointed out in the work Peacock, A. J. (2000). Handbook of polyethylene: structures, properties, and applications. New york: Marcel Dekker editor, page 53: "Fouling occurs principally as a coating on the walls of the reactor inlet piping, where it can reduce flow. This unwelcome material can be high molecular weight or cross-linked polyethylene. When the coating sloughs from the walls it can cause blockages downstream in the reactor and separation system. If high molecular weight or cross-linked polyethylene makes it into the final product it can cause processing problems for the converter. A common problem associated with fouling is the occurrence of inhomogeneities ("gels") seen in films, sheets, and end thin-walled parts."

A free translation for the above text is: "Incrustações ocorrem principalmente como revestimento sobre as paredes da tubulação de entrada do reator, onde pode reduzir o fluxo. Este material não desejado pode ser polietileno de alto peso molecular ou com ligações cruzadas. Quando tal revestimento se destaca das paredes pode causar bloqueios a jusante no reator, e no sistema de separação. Se polietileno de peso molecular elevado ou reticulado está presente no produto final, pode causar problemas de processamento para o conversor. Um problema comum associado com a incrustação é a ocorrência de falta de homogeneidade ("géis") visto em películas, folhas e peças de extremidade de parede fina."

The removal of heat from the reaction is therefore a step of utmost importance in that process, since the loss of control of the temperature of the reactor causes instability in the reaction. Among the possible reactions that may occur, there can be cited the decomposition of the polyethylene, formation of polymer chains of high molecular weight, termination by continuation, widening of the distribution of molecular weight and inter-crossed linkings.

Additionally, there also influence the loss of control the reaction the bad mixture of the initiator in the process fluid, as well as recirculation or stagnation zones in the reactor. To avoid this, the choice of the initiator injection device is fundamental in the process.

The dispersion of the initiator in the process fluid, often results in a localized zone of high concentration of the initiator within the flow of fluid of the process. This localized initiator concentration zone promotes an unbalanced reaction profile in the process fluid: there is generated more polymerization and heat near the injection zone of the initiator and less in other locations upstream and downstream from this injection point.

This unbalanced reaction profile can lead to problems, such as the accumulation of material of high molecular weight near the location of injection of initiator, which might obstruct the injection orifice or the process fluid flow channel. It can also cause an accumulation of material of high molecular weight near the injection location or along the walls of the reaction pipe that result in an eventual detachment of such material of high molecular weight and entry into the process fluid. If a significant concentration of fresh initiator comes into contact with the wall of the reactor tube in the reaction section (where the temperatures are high), the initiator might decompose and react rapidly, initiating a localized hot point ("hot spot") reaction that might propagate the reaction throughout the system.

There are known attempts that seek to improve the mixture of initiator injected into a flow of process fluid through various nozzle configurations and other alterations in the system. Document GB 1.569.518 describes the use of on-line static mixers to create a turbulent fluid. Document WO2005065818 describes a non-circular profile of the reaction pipe. Document U.S. Pat. No. 6,677,408 described an hourglass-format constriction with blade in line that generates a flow and a counter-flow of gas upstream of the injection of initiator. Document U.S. Pat. No. 6,951,908 presents elements of the whirlpool to introduce the initiator into the reaction system. Document EP 449.092 described a generic injection device. Document U.S. Pat. No. 8,308,087 discloses a particular arrangement of an injection device, with certain geometries of the extremity of an injector nozzle transversal to the process fluid flow.

It is noted that there is a constant search in the prior art aiming at improving devices intended to mix initiators in tubular reactors of polymerization of olefins.

SUMMARIZED DESCRIPTION OF THE INVENTION

The present invention, which provides advantages in terms of performance to a continuous polymerization process of ethylene in a tubular reactor, relates in a first aspect to device 10 injector of reaction initiator in a stream of monomer characterized by comprising a constriction 20 to the flow of process fluid, the said constriction 20 provided with a throat 30 at its median point, the said constriction 20 provided of a tubular through bayonet 40 transversal to the entire diameter of the throat 30, such through bayonet 40 having at least one injection orifice 50 along the throat 30 of the constriction 20.

The reference to "at least one injection orifice 50 along the throat 30 . . . " has the following preferential realizations, without excluding any other: one single orifice at the median point or at the proximities of the median point; two orifices distanced symmetrically or approximately symmetrical from the median point; two or more orifices at the proximities of the median point; any number of orifices, symmetrically or non-symmetrically spread, at the proximities of the median point, In "constriction" 20 are comprised a region of diminishing of traversal section, a region of throat of minimum diameter, and a region of expansion of the transversal section.

Figure 7:
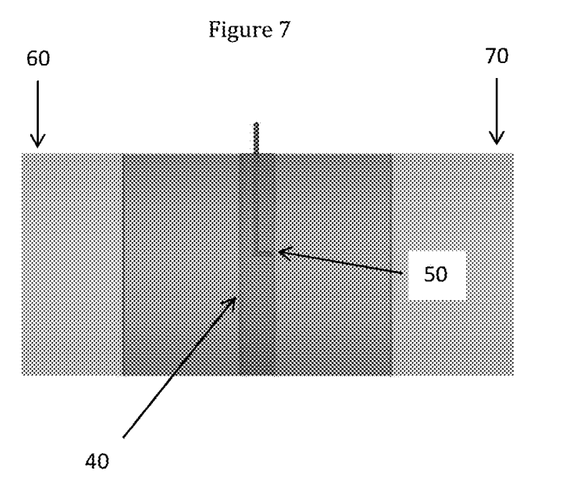
FIG. 7.—lateral schematic view, in partial cutout, of the device of comparative example 1.
Figure 8:
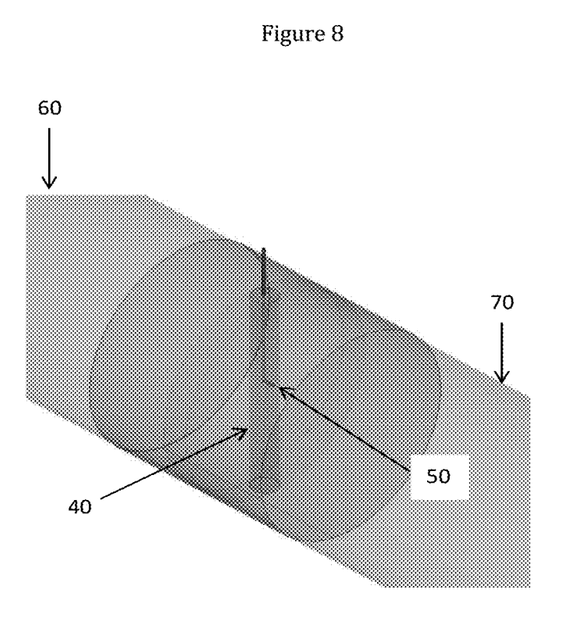
FIG. 8.—Schematic view, in perspective, of the device of comparative example 1.

The understanding of the "constriction 20" includes the particular alternative in which both the "reduction of the cross section" and the "expansion of the cross section" are substantially nonexistent. That is, the mention to constriction 20 also encompasses the alternative in which there is no variation of cross section, as illustrated in FIGS. 7 and 8.

Particularly, the cited at least one injection orifice 50 is oriented towards the downstream side of the process fluid flow.

The injector device 10 of the invention is located between a portion of the piping 60 upstream thereof, which intercepts the constriction 20 at an inlet 65 of the process fluid, and a portion of piping 70 downstream thereof, which intercepts the constriction 20 at an outlet 75 of the process fluid.

The process fluid displaces itself axially inside the piping of the tubular reactor, which crosses the injection device of the invention in the following order:

a region of beginning of the constriction 20 (reduction of the cross section) starting from the inlet 65, a throat 30 where is located the transversal bayonet 40, a portion of expansion (increase of the cross section) of the constriction 20 until the outlet 75.

That is, the process fluid displaces itself from the inlet 65 to the outlet 75 of the injector device, with the throat 30 and the pass-through bayonet 40 positioned between the inlet and the outlet. Particularly the distance between the inlet 65 and the bayonet 40 is identical to the distance between the bayonet 40 and the outlet 75.

As important aspect of the performance of the injector 10 of the invention, containing the pass-through bayonet, that transverses the entire cross section of the fluid flow in the throat 30, is that it presents an advantageous balance between the reduction of recirculation and good mixing downstream thereof, aspects that allow an enhanced control of the polymerization process.

Particularly the dimensions of the constituent parts of the injector 10 of the invention, without excluding any others, are:

linear extension of the constriction 20: 50 to 500 mm, preferably 70 to 250 mm;

external diameter of the bayonet 40: 6 to 20 mm, preferably 8 mm;

linear extension of the throat 30: 6 to 20 mm, preferably 8 mm;

internal diameter of the bayonet 40: 0.5 to 5 mm, preferably 0.8 to 3.2 mm;

diameter of the throat 30: 20 to 200 mm, preferably 30 to 75 mm;

diameter of the inlet 65 and of the outlet 75: 30 to 200 mm (corresponding to the diameter of the tube of the reactor, preferably the same diameter upstream and downstream of the injection device 10);

distance between the inlet 65 and the throat 30: 25-250 mm, being preferably the same distance between the throat 30 and the outlet 75.

Particularly, the injector device of the invention follows the equation $C_{vtotal}+0.0165R_{total} \leq 0.1$, which represents an advantageous compromise between the good homogenization and low recirculation of the process fluid after the injection of the initiator, where $C_{vtotal}$ is the index of mixture and $R_{total}$ is the index of recirculation.

Index of Mixture

The index of mixture is a parameter known in the art, for example such as defined by Olujic et al. in "*Effect of the initial gas distribution on the pressure drop of structure packings*", published in Chemical Engineering and processing 43 (2004) 465-476.

Figure 9:
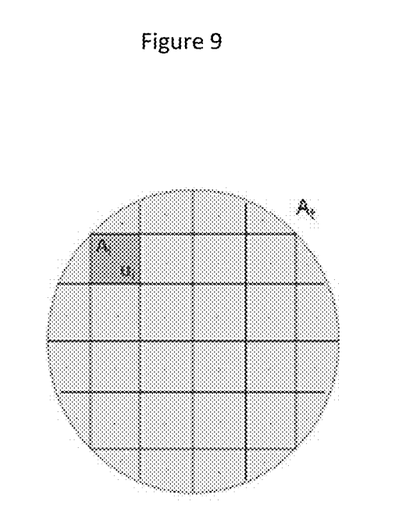
FIG. 9.—Representation of cross section for calculating the variation coefficient Cv, in which $A_t$ is the total area of the cross section, $A_i$ is the area of a cell, $x_i$ é the mass fraction in a cell, $\bar{x}$ is the global average mass fraction and N is the total number of cells. See the representation below

The variation coefficient Cv is used to quantify the degree of mixing upstream from the device 10 of the invention. It is a measure that characterizes the distribution of the mass fraction of the initiator in planes transversal to the outflow. For a cross section, it is defined as:

$$C_V = \left[\frac{1}{A_t}\sum_{i=1}^{N} A_i \left(\frac{x_i - \bar{x}}{\bar{x}}\right)^2\right]^{\frac{1}{2}}$$

wherein $$\bar{x} = \frac{1}{A_t}\sum_{i=1}^{N} A_i x_i$$

in which $A_t$ is the total area of the cross section, $A_i$ is the area of a cell, $x_i$ é the mass fraction in a cell, $\bar{x}$ is the global average mass fraction and N is the total number of cells. See FIG. 9.

Thus, there was evaluated the variation of $C_v$ across the integral of $C_v$ along the planes after the injector device measured until the distance where the mixture is already substantially homogenized ($C_{vtotal}$, or index of mixture).

The closest is the proximity of the index of mixture $C_{vtotal}$ to zero. the greater will be the uniformity of the mixture. Or, in the opposite sense, the higher is the value of $C_{vtotal}$, the worse will be the homogeneity of the mixture.

Recirculation Index

The recirculation is defined as the ratio between the flow in the opposite sense to the main flow and the flow rate in the main flow (Vitor Dal Bó Abella, "Estudo de aspectos geométricos de injetor de iniciador na produção de PE PD em CD F" [*Study of geometric aspects of injector of initiator in the production of PE PD in CFD (Computational Fluid Dynamics)*], Universidade Federal do Rio Grande do Sul, Escola de Engenharia [Federal University of Rio Grande do Sul, Engineering School], Departamento de Engenharia Química [Chemical Engineering Department], Trabalho de Diplomação em Engenharia Química [Graduation Paper in Chemical Engineering], ENG07053, Dec. 9, 2014, page 16.

In order to estimate the degree of recirculation, there was used a parameter r, measured along the planes transversal to the outflow, defined as:

$$R = \frac{\frac{v_x}{|v_x|} - 1}{-2}$$

where $v_x$ is the velocity component in the main flow direction.

Therefore, where there is a flow in the direction opposite to the main flow direction, the value of R will be equal to 1. If there is not, the value of R will be equal to 0. Thus, there was evaluated the area occupied by the recirculation in each plane by means of the integration of R ($R_{total}$, or index of recirculation) in the area of the plane. The greater is the index of recirculation $R_{total}$, the greater will be the extension of the reactor occupied with recirculations.

As a technician skilled in the art is aware, the values of Cv and R are magnitudes able to be used in CFD (Computational Fluid Dynamics), which application to chemical processes provides adequate tools for a better understanding of the turbulence and flow phenomena.

In another aspect, the invention refers to a tubular reactor for continuous polymerization of olefins, partiality directed at low density polyethylene, characterized by comprising one of more initiator initiation devices such as de described hereinbefore.

Within another aspect, the present invention refers to a process for the production of LDPE that uses the said device, a polymerization by free radicals, wherein initiator is injected at one or more points of a tubular reactor wherein flows a process fluid, totally or partially comprised of ethylene, that is converted into polymer by means of a highly exothermic reaction Rtotal in typical conditions of pressure between 1000 and 4000 bar and temperature between 100 and 400° C., in turbulent flow conditions and characterized by comprising one or more steps of injection of initiator to a tubular reactor using initiator injection device(s) such as described hereinbefore.

EXAMPLES

There are provided in the following examples of realization of the invention, for the mere sake of illustration, without imposing any limitations to the scope of the invention beyond those contained in the claims presented further along. Operating conditions and hypothesis having been adopted To simulate the flow, it was assumed that the continuous phase is comprised only by ethene and that the solution of initiator is comprised only by its solvent isododecane. The flow was considered isothermal and uncompressible, that is, the specific mass and the viscosity of each fluid were constant throughout the entire simulation. There are no changes of phase nor chemical reactions.

In the examples that follow, the CFD simulations were conducted using the software ANSYS Fluent® version 14.5. The computing grid was generated using a mesher ANSYS Meshing®. Initially there was discretized the geometry to be simulated in a finite number of elements through the generation of the grid by using predominantly hexahedral grids. The grid was refined in the wall regions and in the region of injector of initiator.

$C_{vtotal}$, or index of mixture that corresponds to the variation $C_v$ across the integral of $C_v$ along the planes after the injector device was measured until the distance of 100× the diameter of the piping.

The software used to generate the geometry was the ANSYS DesignModeler®.

For the numeric solving of the transport equations there was used the simulation software ANSYS Fluent®, version 14.5, which solves the transport equations (conservation of mass, amount of movement, species, etc.) by the method of finite volumes.

Schemes of second order upwind spatial discretization were selected for the convective terms of the equations of momentum, turbulent kinetic energy and turbulent dissipation of energy, according to good practices of simulations of CFD (MALISKA, Clovis R. Transferencia de calor e mecanica dos fluidos computacional [*Computational heat transfer and fluid mechanics*] $2^{nd}$ ed. Rio de janeiro: LTC, 2004).

The flow was considered uncompressible, and there was not considered the occurrence of change of phase or chemical reactions.

For modeling of turbulence, there was used the approach named RANS (Reynolds-Averaged Navier-Stokes equations), in which the variables are decomposed using the Reynolds average.

The multicomponent approach was used for modeling the distribution of the initiators in the reactor.

In the multicomponent approach, the species initiator and ethene are mixed at the molecular level and conservation equations are solved for each of the species. In this approach, the specific mass and the viscosity of the mixture are calculated locally as a function of the composition.

The output variables analyzed for each example were the recirculation, related with the formation of vortices and counter-flows in the flow, and the mixture between ethene and initiator. The recirculation was evaluated by means of the profile of velocities and the indexes of recirculation. The mixture was evaluated by means of profile of concentrations of initiator along the reactor and the index of mixture by plane and integral. The results of the simulation were treated statistically, in order to be able to observe and measure the degree of dispersion of the initiator along the reactor. There were used traditional criteria of analysis of dispersion relatively to an average. For this treatment, there was used the software ModeFrontier®, of the company ESTECO, which allowed the obtainment of information on the influence of each of the input parameters on the efficiency of the mixture process and on the existence of recirculations.

Table I below summarizes the data of the examples below, to wit, example 1, comparative example 1, example 2 and comparative example 2. The numbering used in FIGS. 1 and 2, repeated in any of the remaining figures, expresses an equivalent indication.

TABLE I

| SIMULATION | Example 1 | Comparative example 1 | Example 2 | Comparative example 2 |
|---|---|---|---|---|
| Diameter of the tube (60) | 50 mm | 50 mm | 50 mm | 50 mm |
| Diameter of the constriction (20) | 90 mm | 90 mm | 90 mm | 90 mm |
| Flow of ethene | 40 ton/h | 40 ton/h | 40 ton/h | 40 ton/h |
| Flow of initiators | 40 l/h | 40 l/h | 40 l/h | 40 l/h |
| Pressure | 2451 bar | 2451 bar | 2451 bar | 2451 bar |
| Temperature | 150° C. | 150° C. | 150$^a$ C. | 150$^a$ C. |
| Diameter of the throat (30) | 50 mm | 50 mm | 20 mm | 30 mm |
| Depth of the bayonet | 0 | 50 mm | 0 | 30 mm |
| External diameter of the bayonet 40 | 7 mm | 7 mm | 7 mm | 7 mm |
| $C_{vtotal}$ | 0.184916 | 0.88593 | 0.003747 | 0.015512 |
| $R_{total}$ | 0.000389 | 0.72071 | 10.287774 | 4.508572 |
| $C_{vtotal}$ + 0, .065 $R_{total}$ | 0.1849224 | 0.897823 | 0.1734951 | 0.0899033 |

Example 1—Geometry of the Interior According to the Prior Art

Figure 3:
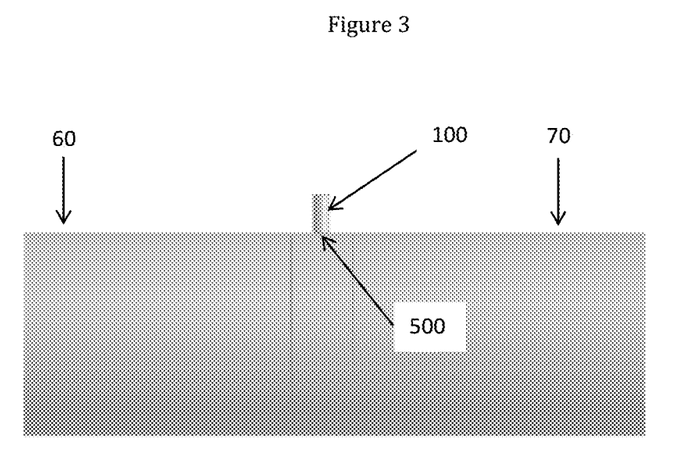
FIG. 3.—Lateral schematic view, in partial cutout, of the device of Example 1.
Figure 4:
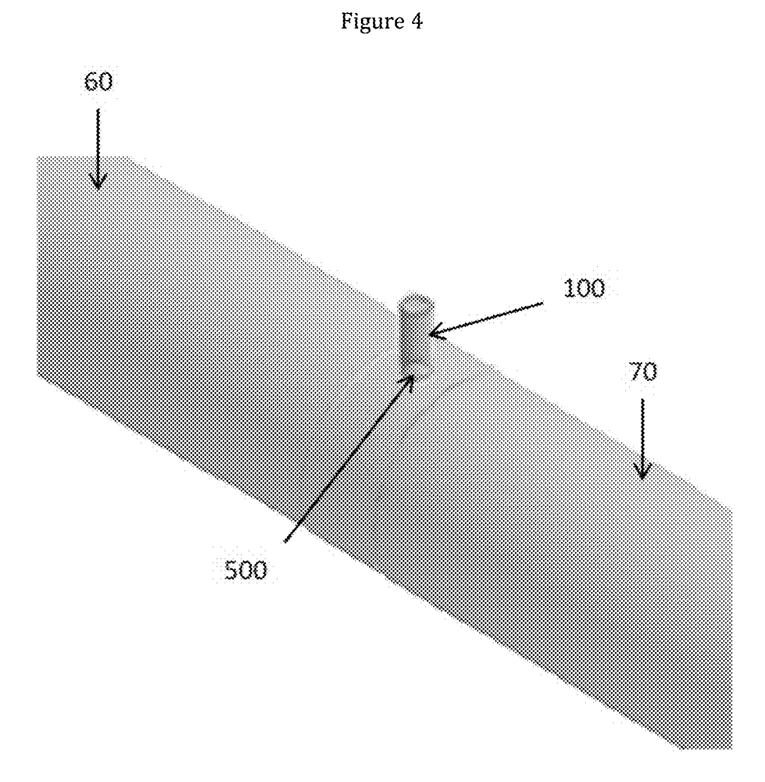
FIG. 4.—Schematic view, in perspective, of the device of Example 1.

For the realization of this example there were adopted the parameters of column 1 of Table I, illustrated in FIGS. 3 and 4, wherein 100 indicates the initiator injection piping and 500 indicates the point of injection of initiator.

The results obtained for Cv total and Rtotal were 0.184916 and 0.000389, respectively.

The geometry of Example 1 does not present an adequate balance between mixture and recirculation. By the proposed Example 1 presented;

$C_{vtotal}+0.165R_{total}=0.1849224$. The geometry of Example 1 presents a poor mixture of the components and a low recirculation.

Comparative Example 1: Example 1 Versus Geometry of an Injector of the Invention For comparative Example 1 there were used the parameters of the 2$^{nd}$ column of Table I, FIGS. 7 and 8.

In this example there was used as comparison the geometry that is the object of the invention (FIGS. 7 and 8), which constriction 20 is provide with a tubular through-bayonet 40 transversal to the entire diameter of the throat 30, and such through-bayonet 40 having an injection orifice 50 at the median point of the diameter of the throat 30 of the constriction 20, turned downstream.

The values of Cv total and Rtotal were 0.088593 and 0.072071, respectively. The geometry of the comparative example presents an improved mixture of the components when compared with the geometry of Example 1.

By the proposed equation with comparative Example 1 there is obtained: Cvtotal+0.0165Rtotal=0.0897823.

On substituting the geometry of Example 1 by the geometry of comparative example 1, which is the object of the invention, we have an increase in ratio between mixture and recirculation, avoiding localized zones of high concentration of initiator within the flow of fluid of the process, the generation of incrustation and gels, thereby obtaining a production process without loss of control of reaction.

Example 2—Geometry of Injector According to the Prior Art

Figure 5:
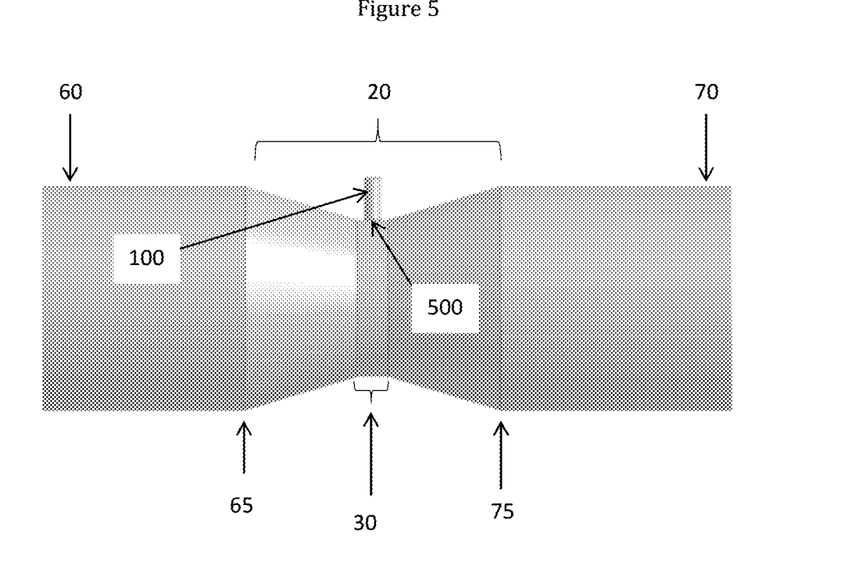
FIG. 5.—Lateral schematic view, in partial cutout, of the device of Example 2.
Figure 6:
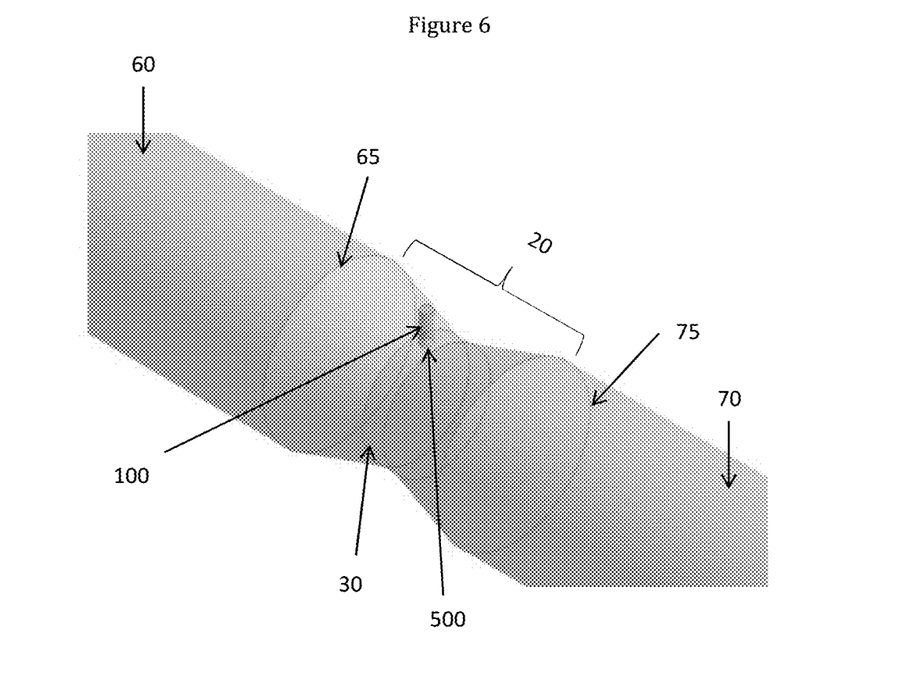
FIG. 6.—Schematic view, in perspective, of the device of Example 2.

For the realization of this example there were adopted the parameters of the 3rd column of Table I, according to FIGS. 5 and 6, wherein 100 indicates the initiator injection piping and 500 indicates the point of injection of initiator.

The results of Cvtotal and Rtotal were 0.00347 and 10.2877774, respectively. By the proposed equation Example 2 presents a $C_{vtotal}+0.165R_{total}=0.1734951$.

The geometry of example 2 does no present an adequate balance between mixture and recirculation. This geometry presents a good mixture of the components and a poor recirculation.

Comparative Example 2: Example 2 Versus Geometry of an Injector of the Invention, with Parameters of the 4$^{th}$ Column of Table, FIGS. 1 and 2

Figure 1:
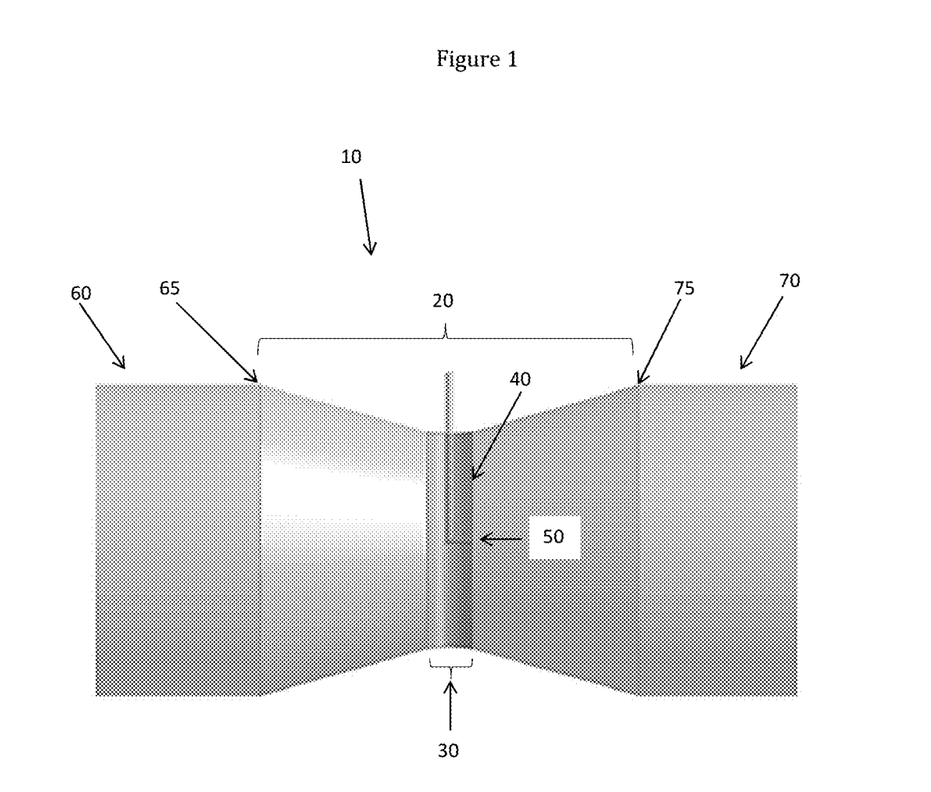
FIG. 1.—lateral schematic view, in partial cutout, of an injector device of the invention. Comparative example 2.
Figure 2:
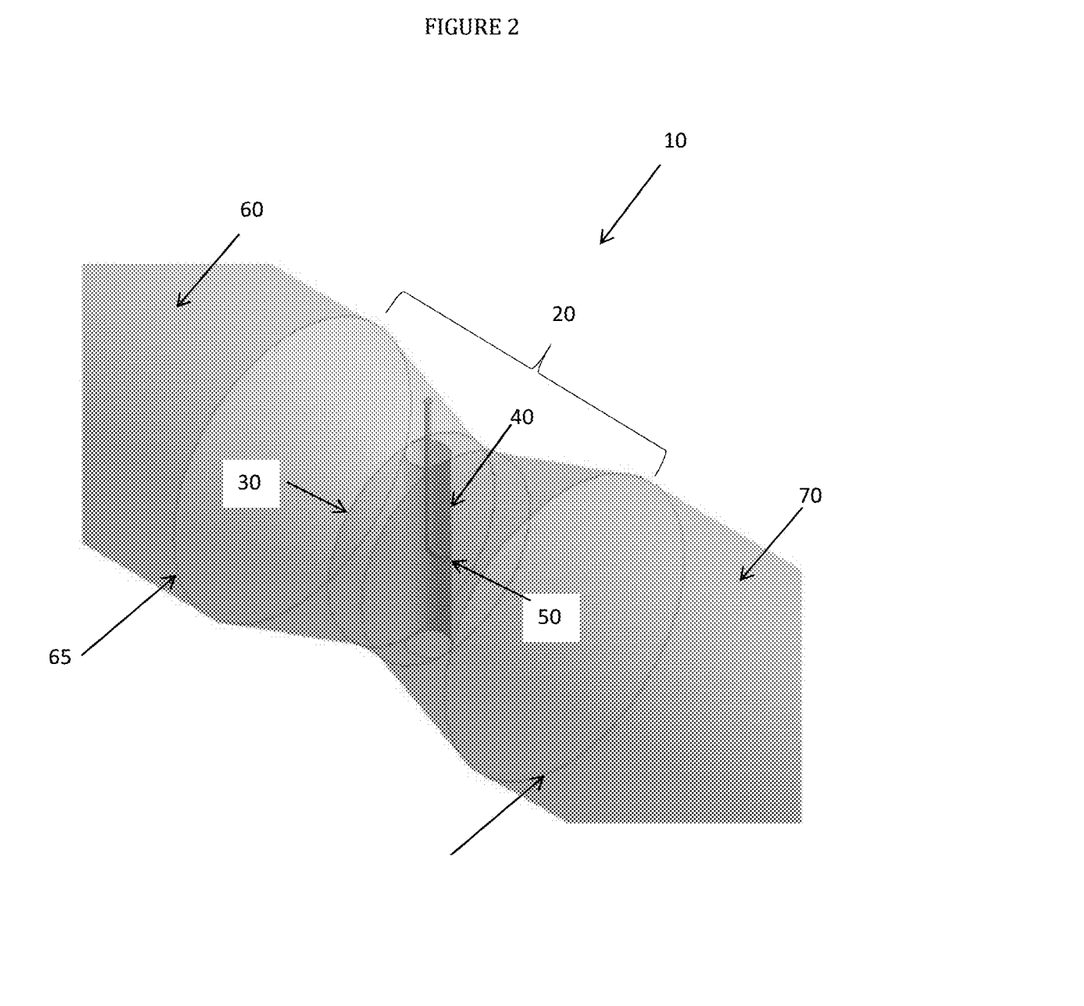
FIG. 2.—Schematic view, in perspective, of an injector device of the invention. Comparative example 2.

In this example there was used the geometry that constitutes the object of the invention which constriction 20 provided with a tubular through-bayonet 40 transversal to the whole diameter of the throat 30, and such through-bayonet 40 having at least one injection orifice 50 at the median point of the throat 30 of the constriction 20.

The results of Cv total and Rtotal were 0.015512 and 4.508572, respectively. The geometry of the comparative example 2 presents an improved mixture of the components when compared with the geometry of Example 2.

By the proposed equation comparative Example 2 has a CVtotal+0.0165Rtotal=0.0899033.

On replacing the geometry of example 2 by the geometry of comparative example 2, which is the object of the invention, we have an increase in the balance between mixture and recirculations avoiding localized zones of high concentration of initiator within the flow of process fluid, the generation of incrustations and gels, obtaining thereby a process of production without losses of control of the reaction.

An individual skilled in the art will be readily aware to evaluate the advantages of the invention, by means of the teachings contained in the text and in the examples having been presented, being able to propose equivalent variations and alternatives of realization not explicitly described without deviating from the scope of the invention, as defined in the attached claims.

The invention claimed is:

1. An injector device of polymerization initiator in a tubular reactor comprising:
   a constriction to the flow of a process fluid, said constriction being provided with a throat at its median point, said constriction being provided with a tubular through-bayonet transversal to the whole of the throat, and said through-bayonet having at least one injection orifice along the throat of the constriction.

2. The device according to claim 1, wherein the at least one injection orifice along the throat is selected from among the following:
   one sole orifice at the median point or near the median point;
   two orifices distanced symmetrically or approximately symmetrically from the median point;
   two or more orifices at the proximities of the median point;
   any number of orifices, with symmetric or non-symmetric spreading, at the proximities of the median point.

3. The device according to claim 1, wherein the at least one injection orifice is oriented downwards relative to the flow of the process fluid.

4. The device according to claim 1, wherein the device is located between a portion of piping upstream thereof, which intercepts the constriction in an inlet of the process fluid, and a portion of piping downstream thereof, which intercepts the constriction in an outlet of the process fluid.

5. The device, according to claim 4, wherein the distance between the inlet and the bayonet is the same distance that exists between the bayonet and the outlet.

6. The device according to claim 4, wherein the dimensions of the constituent parts of the injector are selected from among one or more of the alternatives:
   linear extension of the constriction: 50 to 500 mm;
   external diameter of the bayonet: 6 to 20 mm;
   linear extension of the throat: 6 to 20 mm;
   internal diameter of the bayonet: 0.5 to 5 mm;
   diameter of the throat: 20 to 200 mm;
   diameter of the inlet and of the outlet: 30-200 mm;
   diameter of the tube of the reactor being equal upstream and downstream of the injection device;
   distance between the inlet and the throat: 25-200 mm;
   distance between the outlet and the throat being the same distance between the inlet and the throat.

7. The device according to claim 1, wherein the device follows an equation $C_{vtotal}+0.0165R_{total} \leq 0.1$, wherein $C_{vtotal}$ and $R_{total}$ represent an index of mixture and index of recirculation, respectively.

8. A tubular reactor for continuous polymerization of olefins comprising one or more injection devices according to claim 1.

9. A process of production of polymers and copolymers of ethylene, comprising one or more steps of injection of initiator to a tubular reactor via one or more injection device(s) according to claim 1.

* * * * *